United States Patent
Thiagarajan et al.

(10) Patent No.: US 8,043,688 B2
(45) Date of Patent: Oct. 25, 2011

(54) MULTIWALL SHEET, AN ARTICLE, A METHOD OF MAKING A MULTIWALL SHEET

(75) Inventors: Chinniah Thiagarajan, Karnataka (IN); Praveen Bhat, Karnataka (IN)

(73) Assignee: Sabic Innovative Plastics IP B.V. (NL)

(*) Notice: Subject to any disclaimer, the term of this patent is extended or adjusted under 35 U.S.C. 154(b) by 346 days.

(21) Appl. No.: 12/277,423

(22) Filed: Nov. 25, 2008

(65) Prior Publication Data

US 2010/0129609 A1    May 27, 2010

(51) Int. Cl.
*B32B 3/00* (2006.01)
*B32B 3/22* (2006.01)
*D01D 5/24* (2006.01)
*E04C 2/32* (2006.01)

(52) U.S. Cl. ........ 428/172; 428/178; 428/188; 428/913; 264/177.1; 264/209.1; 264/328.1; 156/109; 52/786.11; 52/793.1

(58) Field of Classification Search .................. 428/120, 428/167, 178, 188, 913, 172; 52/786.11, 52/793.1; 156/107, 109; 264/177.1, 209.1, 264/328.1
See application file for complete search history.

(56) References Cited

U.S. PATENT DOCUMENTS

| | | | |
|---|---|---|---|
| 2,999,835 A | 9/1961 | Goldberg | |
| 3,153,008 A | 10/1964 | Fox | |
| 3,334,154 A | 8/1967 | Kim | |
| 3,953,110 A | 4/1976 | Charoudi | |
| 4,001,184 A | 1/1977 | Scott | |
| 4,123,436 A | 10/1978 | Holub et al. | |
| 4,131,575 A | 12/1978 | Adelmann et al. | |
| 4,147,002 A | 4/1979 | Kautz | |
| 4,201,194 A * | 5/1980 | Charles | 126/633 |
| 4,235,658 A * | 11/1980 | Klingel et al. | 156/244.12 |
| 4,278,721 A * | 7/1981 | Hudgin | 428/122 |
| 4,351,920 A | 9/1982 | Ariga et al. | |
| 4,527,544 A | 7/1985 | Wolf et al. | |
| 6,898,902 B1 * | 5/2005 | Stoffers et al. | 52/18 |
| 6,931,796 B2 | 8/2005 | Adriaansen et al. | |
| 7,138,166 B2 | 11/2006 | Rinehart et al. | |
| 7,334,371 B2 | 2/2008 | Rinehart et al. | |
| 2006/0185838 A1 | 8/2006 | Bourgault et al. | |
| 2008/0038519 A1 | 2/2008 | Hoolhorst et al. | |

FOREIGN PATENT DOCUMENTS

| | | |
|---|---|---|
| DE | 2527013 | 1/1976 |
| EP | 1507047 A1 | 2/2005 |
| WO | 0113704 A1 | 3/2001 |

OTHER PUBLICATIONS

German Patent No. 2527013 (A1); Publication Date: Jun. 18, 1975; Machine Translation; 10 Pages.
Written Opinion of the International Searching Authority; International Application No. PCT/IB2009/054929; International Filing Date: Nov. 5, 2009; Date of Mailing: Feb. 18, 2010; 5 Pages.

(Continued)

*Primary Examiner* — Donald J Loney
(74) *Attorney, Agent, or Firm* — Cantor Colburn LLP (57) ABSTRACT

In one embodiment, a multiwall sheet comprises a first sheet comprising an inner surface and an outer surface, a second sheet comprising a first surface and a second surface; and a rib disposed between the inner surface and the first surface. The outer layer can have surface features and has a surface area of greater than or equal to 140% of a planar, flat, non-profiled surface area for a same unit area.

20 Claims, 4 Drawing Sheets

OTHER PUBLICATIONS

International Search Report; International Application No. PCT/IB2009/054929; International Filing Date: Nov. 5, 2009; Date of Mailing: Feb. 18, 2010; 6 Pages.

ISO 10077-2 International Standard, "Thermal Performance of Windows, Doors and Shutters—Calculation of Thermal Transmittance"; First Edition Oct. 1, 2003; 26 pages.

* cited by examiner

MULTIWALL SHEET, AN ARTICLE, A METHOD OF MAKING A MULTIWALL SHEET

BACKGROUND

In the construction of naturally lit structures (e.g., greenhouses, pool enclosures, conservatories, stadiums, sunrooms, and so forth), glass has been employed in many applications as transparent structural elements, such as, windows, facings, and roofs. However, polymer sheeting is replacing glass in many applications due to several notable benefits.

One benefit of polymer sheeting is that it exhibits excellent impact resistance compared to glass. This in turn reduces maintenance costs in applications wherein occasional breakage caused by vandalism, hail, contraction/expansion, and so forth, is encountered. Another benefit of polymer sheeting is a significant reduction in weight compared to glass. This makes polymer sheeting easier to install than glass and reduces the load-bearing requirements of the structure on which they are installed.

In addition to these benefits, one of the most significant advantages of polymer sheeting is that it provides improved insulative properties compared to glass. This characteristic significantly affects the overall market acceptance of polymer sheeting as consumers desire structural elements with improved efficiency to reduce heating and/or cooling costs. Although the insulative properties of polymer sheeting are greater than that of glass, the thermal insulation value (U value) for a polymer sheet is limited by the number of air cavities as well as the solid polymer content in the sheet. Thus, there is a continuous demand for further improvement.

SUMMARY

Disclosed herein are multiwall sheets and methods for making the same.

In one embodiment, a multiwall sheet comprises a first sheet comprising an inner surface and an outer surface, a second sheet comprising a first surface and a second surface; and a rib disposed between the inner surface and the first surface. The outer layer can have surface features and has a surface area of greater than or equal to 140% of a planar, flat, non-profiled surface area for a same unit area.

In one embodiment, a method for forming a multiwall sheet comprises forming a structure comprising a first sheet comprising an inner surface and an outer surface, a second sheet comprising a first surface and a second surface; and a rib disposed between the inner surface and the first surface. The outer layer can have surface features and has a surface area of greater than or equal to 140% of a planar, flat, non-profiled surface area for a same unit area.

The above described and other features are exemplified by the following detailed description.

DETAILED DESCRIPTION

Disclosed herein are multiwall sheets that offer improved insulated properties. More specifically, multiwall sheets are disclosed herein that comprise profiled surface features disposed upon a surface of the multiwall sheet. As used herein, "surface features" are intended to include defined, formed features and not mere surface roughness (e.g., surface features are not formed merely by grit blasting a surface). This profiled surface allows for increased surface area of the multiwall sheet with a corresponding decrease in the thermal insulation value. Several methods for manufacturing these improved multiwall sheets are also disclosed.

Approximately 30 percent of the world's energy resources are used for climate control. The multiwall sheets of the present application have modified surfaces, which increase the convective heat transfer coefficient with surface features. These surface features, located on the outer edges of each of the sheets, increase the surface area of the multiwall sheet. The increased surface area per unit area aids in achieving a lower thermal transmittance (U value) for the sheet. A lower U value is an indication for lower thermal transmittance that more heat transfer can be blocked and/or removed from and/or through the sheet. This improvement in thermal insulation performance can be proportionally related to the energy savings for climate control. The optical properties of the sheet are also improved due to secondary reflection of the incident radiation by the surface features (also referred to as the "profiled features"). This improvement in thermal resistance helps to provide energy savings with a reduction in thermal insulation, in addition to an increase in human comfort by minimizing the temperature gradient. The multiwall sheets also provide increased diffused light performance. The multiwall sheets as disclosed herein can have surface features with multiple superimposed shapes and/or multi-level surface features (e.g., a stepped three-dimensional profile) and can be on any size scale that will provide the desired effects (e.g., millimeter, micrometer, or nanometer sized surface features).

In one embodiment, a multiwall sheet comprises a first sheet comprising an inner surface and an outer surface, a second sheet comprising a first surface and a second surface; and a rib disposed between the inner surface and the first surface. The outer layer can have surface features and has a surface area of greater than or equal to 140% of a planar, flat, non-profiled surface area for a same unit area.

In one embodiment, a method for forming a multiwall sheet comprises forming a structure comprising a first sheet comprising an inner surface and an outer surface, a second sheet comprising a first surface and a second surface; and a rib disposed between the inner surface and the first surface. The outer layer can have surface features and has a surface area of greater than or equal to 140% of a planar, flat, non-profiled surface area for a same unit area. The multiwall sheet may have a normalized thermal insulation value (U) as measured by ISO 10077 of less than or equal to 0.028 W/m·K.

In the above embodiment(s), the second surface can comprise surface features; the surface features (and/or the second surface features) can be a complex shape(s) (for example, the surface feature(s) can have a graduated, stepped pattern, a complex shape formed by the combination of a triangle and a circle or partial circle); the surface area can be greater than or equal to 150% of the planar, flat, non-profiled surface area for the same unit area, specifically, greater than or equal to 225% of the planar, flat, non-profiled surface area for the same unit area, more specifically, greater than or equal to 250% of the planar, flat, non-profiled surface area for the same unit area; and/or the normalized linear thermal transmittance value can be less than or equal to 0.018 W/m·K, specifically, less than or equal to 0.010 W/m·K, more specifically, less than or equal to 0.001 W/m·K.

Figure 1:
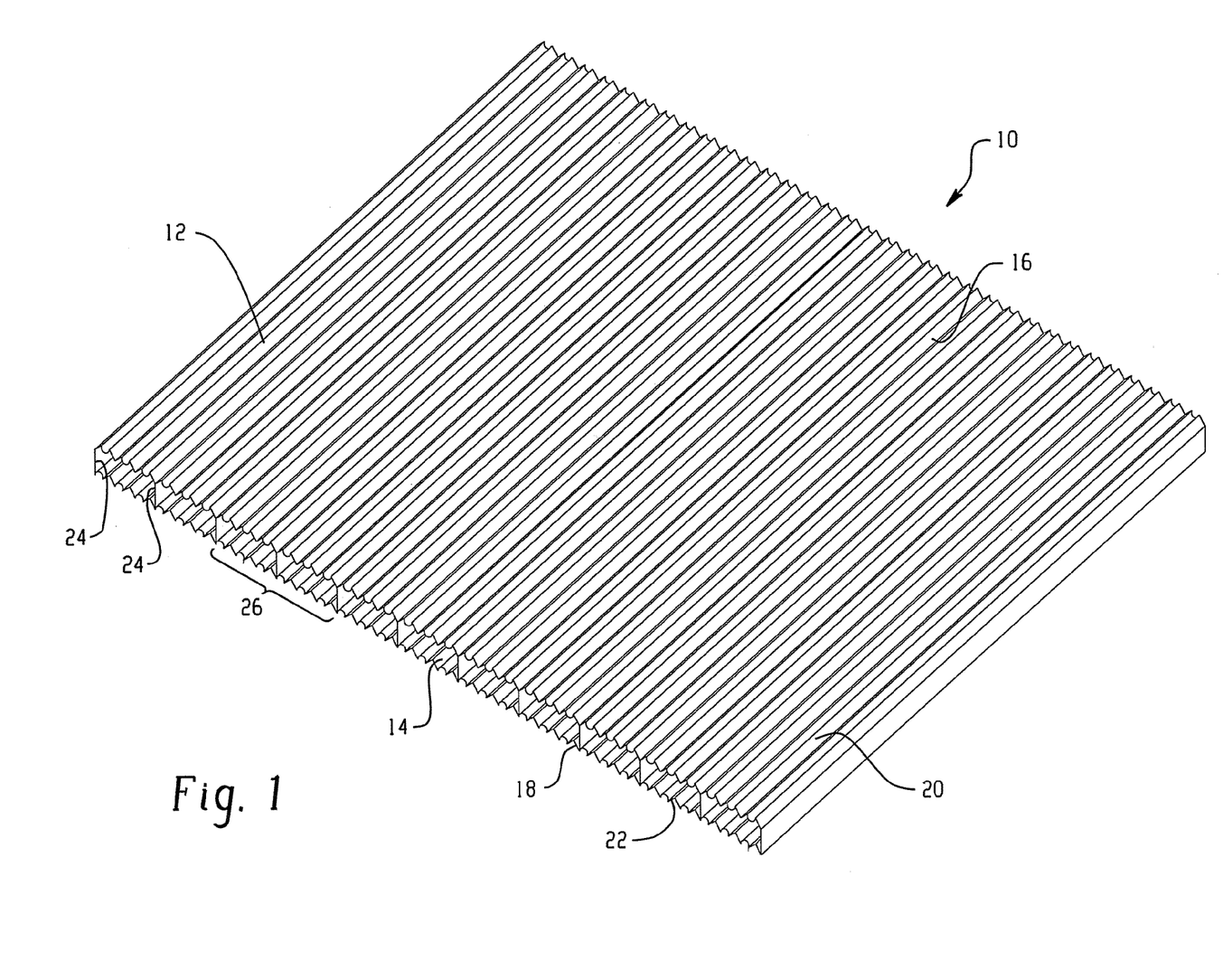
FIG. 1 is an oblique view of an embodiment of a multiwall sheet.

Turning now to the figures, FIG. 1 illustrates an oblique view of an exemplary multiwall sheet 10. The multiwall sheet 10 comprises a first sheet 12, a second sheet 14, a profiled surface 16 on the first sheet, a profiled surface 18 on the second sheet, and ribs 24 disposed on a surface of the multiwall sheet 10. Disposed on the outer layer of the first sheet 12 and the second sheet 14 are a multitude of profiled surface features 20, 22 that are capable of directing light, diffusing light, polarizing light, and combinations comprising at least one of the foregoing. The profiled surface features 20, 22 can be disposed on any surface of the multiwall sheet 10.

Figure 2:
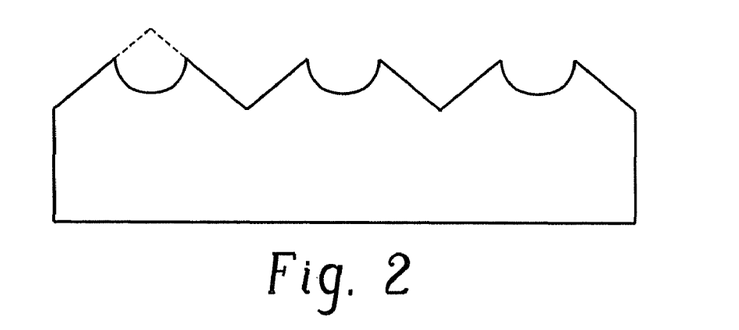
FIG. 2 is a side view of an embodiment of the profiled surface features of the multiwall sheet.
Figure 3:
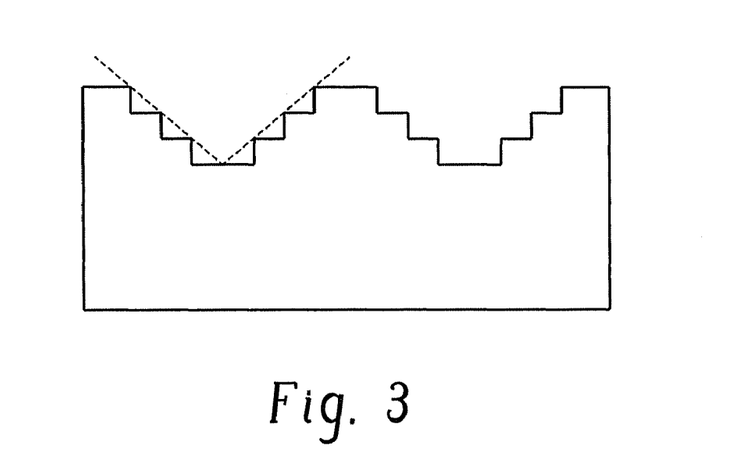
FIG. 3 is a side view of an embodiment of the profiled surface features of the multiwall sheet.
Figure 4:
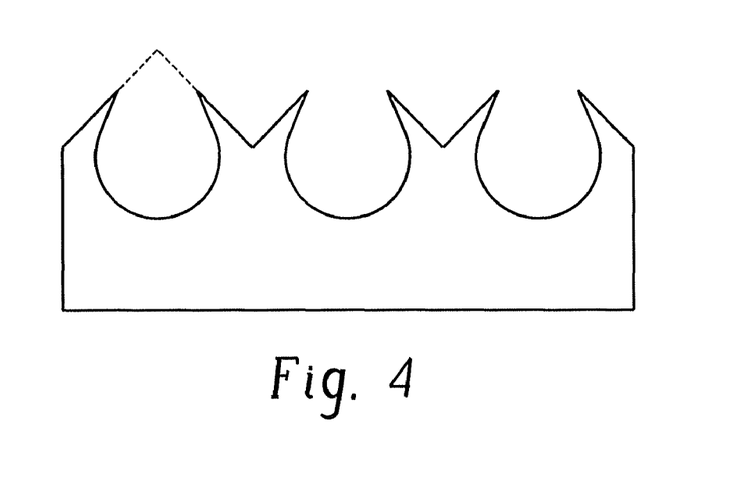
FIG. 4 is a side view of an embodiment of the profiled surface features of the multiwall sheet.

Referring now to FIGS. 2 and 3, a side (or cross sectional) view of an embodiment of the complex surface features of the multiwall sheet is illustrated. The surface features as illustrated in FIGS. 2 and 3 have multiple superimposed simple shapes (e.g., dual simple shapes) within a given profile to increase the surface area. Simple shapes include triangular, truncated triangular, saw-toothed, rectangular, square, circular, and semi-circular. In one embodiment as illustrated in FIG. 2, the profiled surface features comprise a generally triangular shape (illustrated by the dashed lines in FIG. 2), wherein the portion of the triangle that would have been the point is replaced by a generally partial circular shape that cuts into the triangular portion (e.g., a substantially triangular feature with a half circle shape) to form the complex shape of FIG. 2. In another embodiment as illustrated in FIG. 3, the surface features comprise a generally triangular shape (illustrated by the dashed lines in FIG. 3), wherein the smooth sides of the triangle are replaced by graduated steps (e.g., the steps are carved from the sides of the generally triangular shape). FIG. 4 illustrates an embodiment similar to FIG. 2, wherein the surface features comprise a generally triangular shape (illustrated by the dashed lines in FIG. 4), wherein the portion of the triangle that would have been the point is replaced by a generally circular shape (e.g., a triangular feature with a substantially circular shape).

As can be seen from FIGS. 2, 3, and 4, the surface area of the sheet per unit area is increased with the surface features as displayed thereon. The increase in surface area aids in removing the convective heat from the sheet and thus decreasing the overall thermal transmittance of the sheet. In the embodiment illustrated in FIG. 2, the surface area can be increased greater than or equal to 20% compared to a base design having no surface features (or planar, flat surface), specifically greater than or equal to 30%, and more specifically greater than or equal to 40%. In the embodiment illustrated in FIG. 3, the surface area can be increased greater than or equal to 25% as compared to a base design having no surface features, specifically greater than or equal to 35%, more specifically greater than or equal to 45%, still more specifically greater than or equal to 55%, and yet more specifically greater than or equal to 60%. In the embodiment illustrated in FIG. 4, the surface area can be increased by greater than or equal to 100% as compared to a base design having no surface features, specifically greater than or equal to 120%, more specifically greater than or equal to 130%, still more specifically greater than or equal to 140%, and yet more specifically greater than or equal to 150%. In the embodiment illustrated in FIG. 4, the surface area can be increased by greater than or equal to 10,000% as compared to a base design having no surface features.

Figure 5:
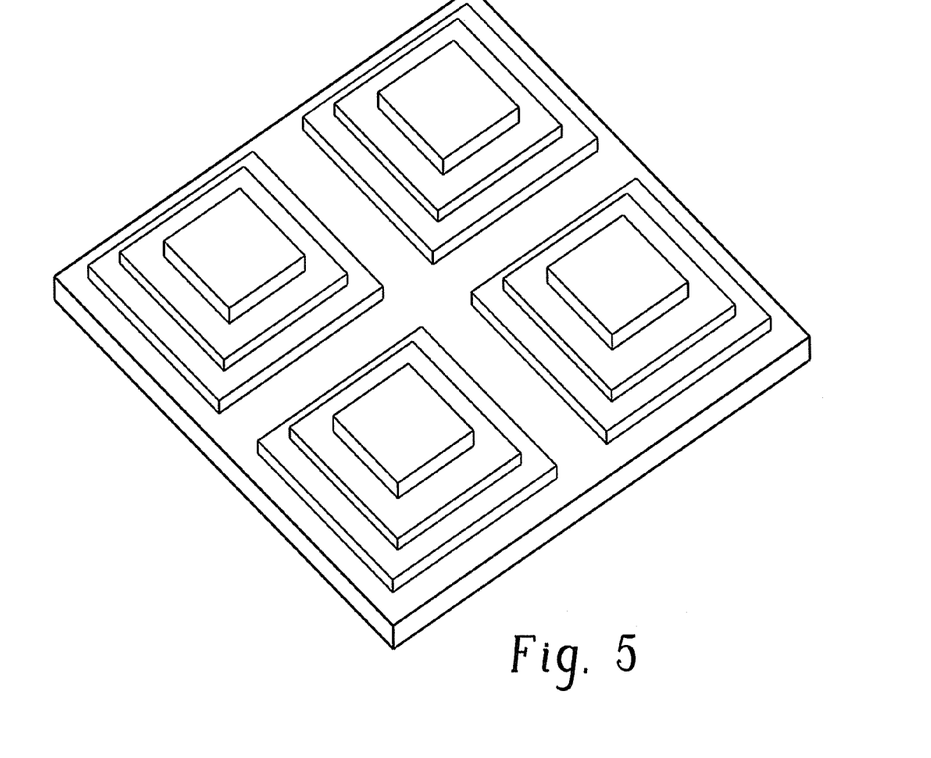
FIG. 5 is a front view of an embodiment of a sheet with three-dimensional profiled surface features.

Three-dimensional profiled surface features, are also contemplated. In one embodiment as illustrated in FIG. 5, three-dimensional stepped profiled surface features are illustrated. The embodiment shown in FIG. 5 illustrates a three-dimensional version of the surface features, wherein these features would have a cross sectional view such as that illustrated in FIG. 3. As shown in FIG. 5, the surface features comprise steps where each step comprises a generally triangular shape wherein the portion of the triangle that would have been the peak is replaced by graduated steps, e.g., where each step in succession is larger than the one above it, creating a side profile similar to that as illustrated in FIG. 3. In other words, the surface features described herein include features that are constant across the sheet (i.e., that have a constant cross section (in one direction) across the entire sheet; e.g., as illustrated in FIG. 1), and can also include features that vary across the sheet (i.e., the cross section changes depending upon where across the sheet the cross section is taken (over a peak/plateau of a feature, or along side of a feature (See FIGS. 5 and 9)).

Figure 8:
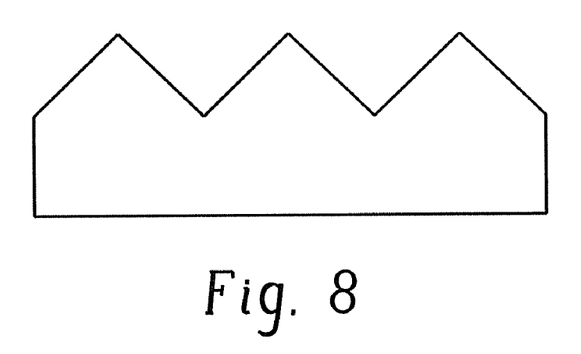
FIG. 8 is a side view of a sheet with surface features having no base between the features.

The surface features can be any size capable of increasing the surface area of the sheet as compared to a sheet having a base design with no surface features or having a saw toothed design as in FIG. 8. For example, in the embodiments illustrated in FIGS. 2, 3, and 4, the size of the generally triangular surface feature before the peak is replaced by a partially circular surface feature or graduated steps, can be 1 millimeter (mm) to 100 mm, while the size of the partially circular shape or graduated steps can be 1 micrometer (μm) to 1 mm. In another embodiment, the size of the generally triangular surface feature before the peak is replaced by a partially circular surface feature or graduated steps can be 1 μm to 1 mm, while the size of the partially circular shape or graduated steps can be 10 nanometers (nm) to 100 nm.

With the increased surface area, it is possible to have a decreased thermal insulation value, which is an indication that heat has been removed from the sheet. For example, with the profiled surface features illustrated in FIG. 2, the thermal insulation value can be decreased by greater than or equal to 15% as compared to a base design having no surface features, specifically greater than or equal to 20%. With the surface features as illustrated in FIG. 3, the thermal insulation value can be decreased by greater than or equal to 20% as compared to a base design having no surface features, more specifically greater than or equal to 25%, and even more specifically greater than or equal to 27%. In the embodiment illustrated in FIG. 4, the thermal insulation value can be decreased by greater than or equal to 25% as compared to a base design having no surface features, specifically greater than or equal to 35%, more specifically greater than or equal to 45%, and still more specifically greater than or equal to 50%.

A multiwall sheet can be formed from polymer processing methods, such as extrusion or injection molding, if produced as a unitary structure. Continuous production methods, such as extrusion, generally offer improved operating efficiencies and greater production rates than non-continuous operations, such as injection molding. Specifically, a single screw extruder can be employed to extrude a polymer melt (e.g., polycarbonate, such as Lexan®, commercially available from SABIC Innovative Plastics). The polymer melt is fed to a profile die capable of forming an extrudate having the cross-section of the multiwall sheet 10 illustrated in FIG. 1. The multiwall sheet 10 travels through a sizing apparatus (e.g., vacuum bath comprising sizing dies) and is then cooled below its glass transition temperature (e.g., for polycarbonate, about 297° F. (147° C.)).

After the panel has cooled, it can be cut the desired length utilizing an extrusion cutter, such as an indexing in-line saw. Once cut, the multiwall sheet can be subjected to secondary operations before packaging. Exemplary secondary operations can comprise annealing, printing, attachment of fastening members, trimming, further assembly operations, and/or any other desirable processes. The size of the extruder, as measured by the diameter of the extruder's screw, is based upon the production rate desired and calculated from the volumetric production rate of the extruder and the cross-sectional area of the panel. The cooling apparatus can be sized (e.g., length) to remove heat from the extrudate in an expedious manner without imparting haze.

Haze can be imparted when a polymer (e.g., polycarbonate) is cooled rapidly. Therefore, the cooling apparatus can operate at warmer temperatures (e.g., greater than or equal to about 100° F. (39° C.), or more specifically, greater than or equal to 125° F. (52° C.), rather than colder temperatures (e.g., less than 100° F. (39° C.), or more specifically, less than or equal to about 75° F. (24° C.)) to reduce hazing. If warmer temperatures are employed, the bath length can be increased to allow ample time to reduce the extrudate's temperature below its glass transition temperature. The size of the extruder, cooling capacity of the cooling apparatus, and cutting operation can be capable of producing the multiwall sheet 10 at a rate of greater than or equal to about 5 feet per minute. However, production rates of greater than about 10 feet per minute, or even greater than about 15 feet per minute can be achieved if such rates are capable of producing surface features that comprise the desired attributes.

Coextrusion methods can also be employed for the production of the multiwall sheet 10. Coextrusion can be employed to supply different polymers to any portion of the multiwall sheet's geometry to improve and/or alter the performance of the panel and/or to reduce raw material costs. In one embodiment, a coextrusion process can be employed to reduce raw material costs by supplying a less expensive polymer to non-structural sections (e.g., foamed or recycled materials). In another embodiment, a coextrusion process can be employed to apply a polymer comprising high light transmission (e.g., greater than or equal to about 80%) to the profiled surface features 20, 22, first sheet 12 and/or second sheet 14. One skilled in the art would readily understand the versatility of the process and the myriad of applications in which coextrusion can be employed in the production of multiwall sheets.

Figure 6:
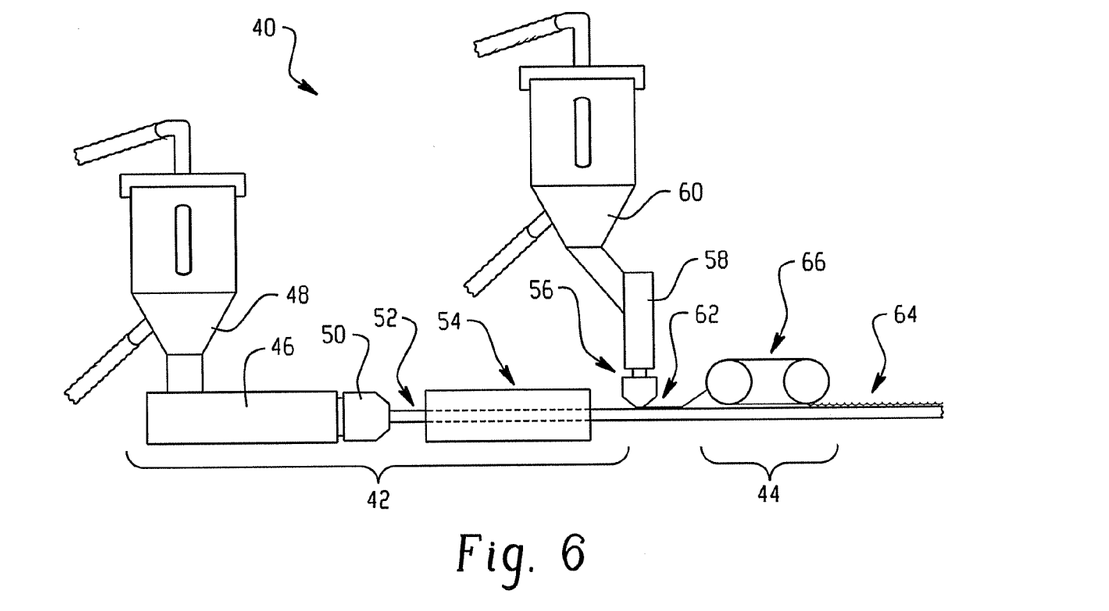
FIG. 6 is a side view of an embodiment of a multiwall sheet manufacturing line.

Referring now to FIG. 6, a side view of an embodiment of a multiwall sheet forming manufacturing line generally referred to as 40, is illustrated. In FIG. 6, the manufacturing line 40 comprises an extrusion process 42 and a surface feature forming process 44. The extrusion process 42 comprises a primary extruder 46 to which is supplied a polymer (not shown) from a hopper/dryer 48. The polymer is melted and conveyed through the extruder 47 and pushed through a profile die 50. The profile die 50 comprises a design that is capable of producing a profile 52. The profile 52 is fed through a vacuum water bath 54 that is capable of sizing and cooling the profile 52. The profile 52 continues into the surface feature forming process 44, which comprises a hot melt coating die 56 that disposes a hot melt 62 onto the top sheet of the profile 52. The hot melt coating die 56 is fed from a secondary extruder 58 that converts a second polymer (not shown) into the hot melt 62. The secondary extruder 58 is fed the second polymer by a second hopper/dryer 60. Once the hot melt 62 is disposed on the profile 52, the hot melt 62 is formed into profiled surface features 64 by an embossing belt 66. It is to be understood that the multiwall sheet forming manufacturing line 40 can comprise variations of the extrusion process 42 and the surface feature forming process 44 can comprises additional operations such as coating, forming, laminating, printing, labeling, annealing, cutting, trimming, assembling, and so forth, as well as combinations comprising at least one of the foregoing.

A coating(s) can be disposed on any of the sheet's surfaces to improve the sheet's properties if the coating does not decrease the strength or light transmission of the panel such the panel is non-operative. Exemplary coatings can comprise antifungal coatings, hydrophobic coatings, hydrophilic coatings, light dispersion coatings, anti-condensation coatings, scratch resistant coatings, and the like, as well as combinations comprising at least one of the foregoing.

The multiwall sheet 10 can be formed from polymeric materials, such as thermoplastics and thermoplastic blends. Exemplary thermoplastics include polyalkylenes (e.g., polyethylene, polypropylene, polyalkylene terephthalates (such as polyethylene terephthalate, polybutylene terephthalate)), polycarbonates, acrylics, polyacetals, styrenes (e.g., impact-modified polystyrene, acrylonitrile-butadiene-styrene, styrene-acrylonitrile), poly(meth)acrylates (e.g., polybutyl acrylate, polymethyl methacrylate), polyetherimide, polyurethanes, polyphenylene sulfides, polyvinyl chlorides, polysulfones, polyetherketones, polyether etherketones, polyether ketone ketones, and so forth, as well as combinations comprising at least one of the foregoing. Exemplary thermoplastic blends comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like.

In one embodiment, a polycarbonate material is employed, such as those designated by the trade name Lexan®, which are commercially available from SABIC Innovative Plastics. Thermoplastic polycarbonate resin that can be employed in producing the plastic sheet includes, without limitation, aromatic polycarbonates, copolymers of an aromatic polycarbonate such as polyester carbonate copolymer, blends thereof, and blends thereof with other polymers depending on the end use application. In another embodiment, the thermoplastic polycarbonate resin is an aromatic homo-polycarbonate resin such as the polycarbonate resins described in U.S. Pat. No. 4,351,920 to Ariga et al.

For example, some possible polycarbonates can be prepared by reacting a dihedral phenol with a carbonate precursor, such as phosgene, a haloformate, or a carbonate ester. Generally, such carbonate polymers comprise recurring structural units of the Formula (I)

(I)

wherein A is a divalent aromatic radical of the dihydric phenol employed in the polymer producing reaction. In one embodiment, the polycarbonate can have an intrinsic viscosity (as measured in methylene chloride at 25° C.) of about 0.30 to about 1.00 deciliter/gram (dL/g). The dihydric phenols employed to provide such polycarbonates can be mononuclear or polynuclear aromatic compounds, containing as functional groups two hydroxy radicals, each of which is attached directly to a carbon atom of an aromatic nucleus. Possible dihydric phenols include, for example, 2,2-bis(4-hydroxyphenyl)propane (bisphenol A), hydroquinone, resorcinol, 2,2-bis(4-hydroxyphenyl)pentane, 2,4'-(dihydroxydiphenyl)methane, bis(2-hydroxyphenyl)methane, bis(4-hydroxyphenyl)methane, bis(4-hydroxy-5-nitrophenyl) methane, 1,1-bis(4-hydroxyphenyl)ethane, 3,3-bis(4-hydroxyphenyl)pentane, 2,2-dihydroxydiphenyl, 2,6-dihydroxynaphthalene, bis(4-hydroxydiphenyl)sulfone, bis(3,5-diethyl-4-hydroxyphenyl)sulfone, 2,2-bis(3,5-dimethyl-4-hydroxyphenyl)propane, 2,4'-dihydroxydiphenyl sulfone, 5'-chloro-2,4'-dihydroxydiphenyl sulfone, bis(4-hydroxyphenyl)diphenyl sulfone, 4,4'-dihydroxydiphenyl ether, 4,4'-dihydroxy-3,3'-dichlorodiphenyl ether, 4,4-dihydroxy-2,5-dihydroxydiphenyl ether, and the like, and mixtures thereof. Other possible dihydric phenols for use in the preparation of polycarbonate resins are described, for example, in U.S. Pat. No. 2,999,835 to Goldberg, U.S. Pat. No. 3,334,154 to Kim, and U.S. Pat. No. 4,131,575 to Adelmann et al.

The polycarbonate resins can be manufactured by known processes, such as, for example and as mentioned above, by reacting a dihydric phenol with a carbonate precursor, such as phosgene, a haloformate, or a carbonate ester, in accordance with methods set forth in the above-cited literature and in U.S. Pat. No. 4,123,436 to Holub et al., or by transesterification processes such as are disclosed in U.S. Pat. No. 3,153,008 to Fox, as well as other processes.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired. Branched polycarbonates are also useful, such as are described in U.S. Pat. No. 4,001,184 to Scott. Also, there can be utilized combinations of linear polycarbonate and a branched polycarbonate. Moreover, combinations of any of the above materials can be employed to provide the polycarbonate resin.

The polycarbonates can be branched or linear and generally will have a weight average molecular weight (Mw) of 10,000 to 200,000 atomic mass units (AMU), specifically 20,000 to 100,000 AMU as measured by gel permeation chromatography. The polycarbonates disclosed herein can employ a variety of end groups to improve performance, such as bulky mono phenols, including cumyl phenol.

Additives can be employed to modify the performance, properties, or processing of the polymeric material. Exemplary additives comprise antioxidants, such as, organophosphites, for example, tris(nonyl-phenyl)phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, blowing agents, flame retardants, and impact modifiers, among others.

The specific polymer chosen will be capable of providing sufficient light transmission. More specifically, the polymer will be capable of providing a transmittance of greater than or equal to about 80%, or, even more specifically, greater than or equal to about 85%, as tested per ASTM D-1003-00 (Procedure B, Spectrophotometer, using illuminant C with diffuse illumination with unidirectional viewing).

Transmittance is defined in the following formula (II) as:

$$\% T = \left(\frac{I}{I_O}\right) \times 100\% \tag{II}$$

wherein:
I=intensity of the light passing through the test sample
$I_O$=Intensity of incident light In addition to transmittance, the polymeric material can be chosen to exhibit sufficient impact resistance such that the sheet is capable of resisting breakage (e.g., cracking, fracture, and the like) caused by impact (e.g., hail, birds, stones and so forth). Therefore, polymers exhibiting an impact strength greater than or equal to about 7.5 foot-pounds per square inch, ft-lb/in$^2$ (4.00 joules per square centimeter, J/cm$^2$), or more specifically, greater than about 10.0 ft-lb/in$^2$ (5.34 J/cm$^2$) or even more specifically, greater than or equal to about 12.5 ft-lb/in$^2$ (6.67 J/cm$^2$) are desirable, as tested per ASTM D-256-93 (Izod Notched Impact Test). Further, desirably, the polymer has ample stiffness to allow for the production of a sheet that can be employed in applications wherein the sheet is generally supported and/or clamped on two or more sides of the sheet (e.g., clamped on all four sides), such as in greenhouse applications comprising tubular steel frame construction. Sufficient stiffness herein is defined as polymers comprising a Young's modulus (e.g., modulus of elasticity) that is greater than or equal to about $1 \times 10^9$ N/m$^2$, more specifically $1 \times 10^9$ to $20 \times 10^9$ N/m$^2$, and still more specifically $2 \times 10^9$ to $10 \times 10^9$ N/m$^2$.

The ribs 24 can be configured in any manner to provide desirable properties. For example, the rib's length, width, number, orientation, shape, weight, and so forth, can be tailored to alter the strength, insulative ability, light transmission, as well as other variables of the panel. In one embodiment, the ribs can cross at about their centers to form an X-shaped structure.

In addition to the polymer conversion processes disclosed above for forming the profiled surface features on a multiwall sheet, additional processes can be employed. For example, injection molding and replica molding processes, such as those employed to fabricate holograms or compact disks, can be employed to form surface features. In addition, elastomeric molds and/or stamps can be used as master patterns in forming processes to form surface features.

Alternatively, or in conjunction, processes capable of forming a mask can be employed for producing a master pattern (e.g., embossing belt and/or embossing drum), which can be used to form surface features or the mask can be employed to directly form surface features on a substrate (e.g., multiwall sheet). For example, lithographic processes can be employed to form surface features on a master pattern or multiwall sheet. One example of a process is a photolithography process wherein a master pattern is transferred to a medium that serves as the photoresist (e.g. photosensitive film) via ultraviolet light. Once the desired features are formed in the photoresist, it can be employed as a mask that will allow a media to be applied to the portions of the substrate that are not masked. Alternatively, a maskless photolithographic process can be employed, wherein surface features can be formed directly on a photoresist wherein the photoresist is disposed on the substrate using a focused ultraviolet light (e.g., laser). Other examples are stereolithographic methods, such as those that employ photocurable polymers, wherein a three-dimensional surface feature can be formed by selectively curing portions of a photocurable polymer using a laser.

Self assembly processes can also be employed, wherein a surface feature can be formed as compounds and/or molecules disposed on the surface of a substrate that organize themselves to achieve a final structure that is in its lowest free energy state. Yet further laser engraving processes can be employed to engrave and/or shape surface features in and/or on a substrate. Still further, replication on the calibrator, which is used in the extrusion process of multiwall sheets for shape control, can be employed for forming surface features on a substrate and hot stamping on the multiwall sheet processes can be employed.

The profiled surface features are capable of directing light into the multiwall sheet due to their prismatic geometries. The shape of these surface features can comprise any shape that is capable of directing diffusing and/or polarizing light. Specifically, the profiled surface features can comprise a combination of more than one feature. For example, in one embodiment, the surface features can comprise a generally triangular shape where the peak of the triangle is cut into and replaced with a generally circular shape (e.g., a partially-circular shape (e.g., semi-circular) or substantially circular shape) (e.g., FIGS. 2 and 4). In another embodiment, the surface features can comprise a generally triangular shape where the peak of the triangle blunted and the sides of the triangle are replaced with graduated steps (e.g., FIG. 3). FIGS. 2-5 illustrate various shapes and embodiments of the profiled surface features, where FIG. 5 illustrates a three-dimensional embodiment of FIG. 3.

The profiled surface features are capable of reducing the contact angle and can provide hydrophobic functionality due the shape of the profiled features. This functionality can provide self-cleaning advantages for dust free surface.

Thermal transmittance characterizes the heat transfer through the central part of the glazing or multiwall sheet as measured in Watts per square meter Kelvin (W/m²K). More specifically, the U value is the amount of thermal energy that passes across one square meter of the multiwall sheet at a temperature difference between both sides of the sheet. In the present application, the U value was calculated as per the International Standard Organization (ISO) test number 10077-2:2003(E) with a temperature difference between both sides of the sheet of 20 Kelvins (K). The U value or thermal transmittance is calculated by the following formula (III):

$$\frac{1}{U} = \frac{1}{h_i} + \frac{t}{k} + \frac{1}{h_e} \quad \text{(III)}$$

where $h_e$ is the external heat transfer coefficient, $h_i$ is the internal heat transfer coefficient, t is the material thickness, and k is thermal conductivity. Hypermesh® 7.0 software is used during pre-processing, ABAQUS® 6.7 and Hyperview® are used during post processing. The numerical thermal calculation is carried out using a two dimensional heat transfer analysis conforming to EN ISO 10211-1:1995(E). The numerical heat transfer analysis is performed using ABAQUS® 6.7 finite element method (FEM) software. For the purposes of this calculation, it is assumed that principle heat flow in the section tested is perpendicular to a plane parallel to the external and internal surfaces. It is also assumed that the emissivity of the surfaces adjoining the air cavities is 0.9 per ISO 10077-2:2003(E). Solid continuum elements (DC2D4 and DC2D3) were used.

Thermal transmittance of glazing or U is the value that characterizes the heat transfer through the central part of the glazing (i.e., with edge effects), and steady state density of heat transfer rate per temperature difference between the ambient temperatures on each side. The external heat transfer coefficient, $h_e$, in W/m²K, is a function of the wind speed, v, near the glazing given by the following formula (IV):

$$h_e = 10.0 + 4.1v \quad \text{(IV)}$$

A $h_e$ value of 24 W/m²K is used for the purpose of comparing glazing U values. The internal heat transfer coefficient, $h_i$, in W/m²K, is a function of the wind speed, v, near the glazing given by the following formula (V):

$$h_i = h_r + h_c \quad \text{(V)}$$

In the equation, $h_r$, is the radiation conductance and $h_c$ is the convective conductance. For conventional vertical glass surfaces and free convection, $h_i = 4.4 + 3.3 = 7.7$ W/m²K. This value is standardized for the purpose of comparing the glazing U value. Both the external heat transfer coefficient and the internal heat transfer coefficient are calculated using ISO 10292:1994(E).

The heat flow rate in the cavities is represented by an equivalent thermal conductivity, $\lambda_{eq}$. This equivalent thermal conductivity includes the heat flow by conduction, convection, and radiation and also depends upon the geometry of the cavity and any adjacent materials. For unventilated air cavities, equivalent thermal conductivity is given by the following formula (VI):

$$\lambda_{eq} = d/R_s, \quad \text{(VI)}$$

where $R_s$, the convective heat transfer coefficient is represented by the following formula (VII):

$$R_s = 1/(h_a + h_r) \quad \text{(VII)}$$

and $h_a$, the radiation conductance, is represented by the following formula (VIII):

$$h_a = \max\{C_1/d; C_2 \Delta T^{1/3}\}, \quad \text{(VIII)}$$

where d is the dimension of the cavity in the direction of the heat flow, $C_1$ is a constant equal to 0.0235 W/m·K and $C_2$ is a constant equal to 0.71 W/m²K$^{4/3}$. If no emissivity of the surfaces and other information is available, then $\epsilon 1$ is equal to $\epsilon 2$ and both are equal to 0.9 as described above. T is the temperature and is equal to 283 K, and $h_r$, which is the convective conductance, is represented by the following formula (IX):

$$h_r = C_4(1 + (\sqrt{1 + (d/b)^2}) - d/b), \quad \text{(IX)}$$

where $C_4$ is a constant equal to 2.11 W/m²K.

The equivalent density of the sheet (measured in kilograms per cubic meter (kg/m³)) is one method of comparing various multiwall sheets (e.g., for comparing sheets with varying weights and gauges). Equivalent density is calculated by dividing the weight per area of the sheet by the sheet thickness. The multiwall sheets disclosed herein can have a normalized linear thermal transmittance (measured in Watts per meter Kelvin (W/m·K)). The linear normalized thermal transmittance is equal to the thermal transmittance multiplied by the thickness of the sheet. Linear density normalized thermal transmittance (measured in Watt meters per kilogram Kelvin (W·m/kg·K)) is equal to the normalized linear thermal transmittance divided by the equivalent density of the sheet.

The thermal transmittance value (U) for a given sheet is limited by a saturation point with the number of air cavities present in the sheet for a given weight of the material. Air has a thermal transmittance value of about 0.025 W/m·K at room temperature (e.g., 24° C.) and atmospheric pressure. It can be difficult to achieve thermal transmittance values near or less than air because at a certain number of air cavities (i.e., the open space between the first sheet, the second sheet, and each rib), the sheet becomes saturated with the number of air cavities and any additional number of air cavities added will not decrease the thermal transmittance value any further. By increasing the surface area, with the surface features such as illustrated in FIGS. 2-5, thermal transmittance values near or even less than air can be achieved. The multiwall sheets as disclosed herein are capable of having a normalized linear thermal transmittance value less than or equal to the thermal transmittance value of air, specifically, less than or equal to 0.028 W/m·K, more specifically less than or equal to 0.025 W/m·K, more specifically less than or equal to 0.018 W/m·K, even more specifically less than or equal to 0.010 W/m·K, and yet more specifically less than or equal to 0.001 W/m·K.

The total thickness of the multiwall sheet 10 is generally less than or equal to 100 millimeters (mm), more specifically, less than or equal to about 55 mm, still more specifically, less than or equal to about 32 mm, but generally greater than or equal to about 6 mm. In one embodiment, the multiwall sheet 10 has a thickness of 16 mm. In one another embodiment, the multiwall sheet 10 has a thickness of 10 mm.

Each cavity 26 can comprise a width capable of providing sufficient stiffness for the intended use (e.g., as a roofing or sheeting product). More specifically, when assembled, the multiwall sheet 10 can be exposed to a variety of forces caused by snow, wind, rain, hail, and the like. The sheet is desirably capable of withstanding these forces without failing (e.g., buckling, cracking, bowing, and so forth). The specific dimensions of the multiwall sheet 10 can be chosen so that the multiwall sheet 10 can withstand these forces.

Referring again to FIG. 1, when exposed to external conditions (e.g., hot temperatures, cold temperatures, and so forth), the profiled surface features 20, 22 are capable of insulating the multiwall sheet 10 from the external conditions. The profiled surface features 20, 22 provide an increased surface area (i.e., heat transfer area) from which to insulate the interior of the multiwall sheet 10. The increased surface area results in an increase in the convective heat transfer coefficient with a corresponding decrease in the thermal transmittance value. A reduction in the thermal insulation value improves the energy savings potential. The external heat transfer coefficient is equal to about 24 W/m²K and the internal heat transfer coefficient is equal to about 8 W/m²K. These values provide an increased convective heat transfer coefficient that removes the heat from the system and hence, lowers the overall thermal transmittance value, U. In addition to the above described profiled surface features and embodiments, multiple shapes can be utilized as well as multilevel features (e.g., three-dimensional surface features), micrometer scale surface features, and nanometer scale surface features.

The following non-limiting examples, which were all computer simulations, further illustrate the various embodiments described herein.

EXAMPLES

Six multilayer sheets measuring 1 meter (m) in length and 1 m in width comprising polycarbonate are numerically prepared with the thicknesses as listed below in Table 1. Samples A, B, and C are comparative. Sample A represents a multiwall sheet without surface features as described herein (i.e., planar surfaces). Sample B contains truncated triangular surface features (see e.g., FIG. 7), while Sample C contains triangular surface features with no base between each triangular shaped surface feature (see e.g., FIG. 8). Samples 1, 2, and 3 each contain surface features. Sample 1 contains surface features as illustrated in FIG. 2, Sample 2 contains surface features as illustrated in FIG. 3, and Sample 3 contains surface features as illustrated in FIG. 4. For each sample the surface area was calculated based upon the same unit area (in the present case, the unit area was a planar, flat area of 0.032 m² (i.e., 32 mm width by 1,000 mm length)). For the examples the unit area is equal to a 1 m length times a 0.002 m width for a unit area equal to 0.002 m². Table 2 displays the dimensions for the surface features in each Sample, while Table 3 demonstrates the results from the simulations conducted.

The following test standards were used in evaluation of the Samples.

TABLE 1

| Test | Standard | Condition |
| --- | --- | --- |
| External Heat Transfer Coefficient (watts per square meter degree Kelvin (W/m²K) | ISO 10077-2:2003 | 25 |
| Internal Heat Transfer Coefficient (W/m²K) | ISO 10077-2:2003 | 7.7 |
| Temperature Difference between external and internal surfaces (degrees Kelvin (K)) | ISO 10077-2:2003 | 20 |
| U Value (W/m²K) | ISO 10077 | ISO 10077-2:2003 |

Example 1

TABLE 2

Surface Feature Dimensions

| Dimension | Sample A | Sample B | Sample C | Sample 1 | Sample 2 | Sample 3 |
| --- | --- | --- | --- | --- | --- | --- |
| Height (mm) | N/A | 0.2 | 0.4 | 0.275 | 0.1 | 0.61 |
| Period Length (mm) | N/A | 1.0 | 1.0 | 1.0 | 1.0 | 1.0 |

TABLE 2-continued

Surface Feature Dimensions

| Dimension | Sample A | Sample B | Sample C | Sample 1 | Sample 2 | Sample 3 |
|---|---|---|---|---|---|---|
| Width of Surface Feature (mm) | N/A | 0.5 | 1.0 | 0.31 | 0.25* | 0.31 |

*The value of 0.25 mm for the width of the surface feature represents the width at the base. The width of the intermediate steps is equal to 0.125 mm.

TABLE 3

Measured U Values for Various Shapes

| Property | Sample A | Sample B | Sample C | Sample 1 | Sample 2 | Sample 3 |
|---|---|---|---|---|---|---|
| Sheet Thickness (mm) | 16 | 16 | 16.4 | 16.28 | 16.3 | 16.82 |
| Outer/Inner Skin Thickness (mm) | 0.70 | 0.75 | 0.90 | 0.83 | 0.85 | 1.11 |
| Middle Skin Thickness (mm) | 0.15 | 0.15 | 0.15 | 0.15 | 0.15 | 0.15 |
| Diagonal Skin Thickness (mm) | 0.20 | 0.20 | 0.20 | 0.20 | 0.20 | 0.20 |
| Rib Thickness (mm) | 0.45 | 0.45 | 0.45 | 0.45 | 0.45 | 0.45 |
| Distance between Ribs (mm) | 16 | 16 | 16 | 16 | 16 | 16 |
| Weight per area (kg/m$^2$) | 2.945 | 2.945 | 2.945 | 2.946 | 2.946 | 2.949 |
| Surface Heat Transfer Rate (Watts) | 1.367 | 1.431 | 1.485 | 1.528 | 1.582 | 1.740 |
| Surface Area (m$^2$) | $32.0 \times 10^{-3}$ | $36.5 \times 10^{-3}$ | $41.0 \times 10^{-3}$ | $45.1 \times 10^{-3}$ | $51.2 \times 10^{-3}$ | $82.9 \times 10^{-3}$ |
| Heat Flux (W/m$^2$) | 42.71 | 39.22 | 36.23 | 33.89 | 30.90 | 20.98 |
| Temperature Difference (K) | 20 | 20 | 20 | 20 | 20 | 20 |
| U Value (W/m$^2$K) | 2.135 | 1.961 | 1.811 | 1.694 | 1.545 | 1.049 |
| Change in U Value (%) | N/A | 8.16 | 15.17 | 20.65 | 27.64 | 50.87 |
| Increase in Surface Area (%) | N/A | 14.03 | 28.13 | 40.78 | 60.10 | 159.20 |
| Linear Normalized U Value (W/km · K) | 34 | 31 | 29.7 | 27.6 | 25.2 | 17.6 |
| Equivalent Density (kg/m$^3$) | 184 | 184 | 180 | 181 | 181 | 168 |
| Linear Density Normalized U Value (W · m/kg · K) | $1.84 \times 10^{-4}$ | $1.68 \times 10^{-4}$ | $1.66 \times 10^{-4}$ | $1.53 \times 10^{-4}$ | $1.39 \times 10^{-4}$ | $1.05 \times 10^{-4}$ |

As can be seen from Tables 2 and 3, the varying shapes of the surface features disclosed herein produce an increase in the surface area with a corresponding decrease in the thermal transmittance value (U value) for each multiwall sheet. The results demonstrate that Samples 1, 2, and 3 demonstrate increasing amounts of heat being removed from the multiwall sheet as can be seen from the decreasing U value and decreasing linear normalized U value. Sample B, containing truncated triangular shaped surface features (e.g., a modified saw tooth shape), has an 8% decrease in the U value, while Sample C, containing triangular shaped surface features (e.g., a saw tooth shape), has a 14% decrease in the U value as compared to Sample A. However, Sample 1, containing generally triangular surface features wherein the portion of the triangle that would have been the peak is replaced by a generally partial circular shape that cuts into the triangular portion, has a 21% decrease in the U value compared to Sample A (an indication of the amount of heat removed from Sample 1 as compared to Sample A). Sample 2, containing surface features with a generally triangular shape, wherein the portion of the triangle that would have been the point is replaced by graduated steps that cut into the sides of the triangular shape, has a 28% decrease in the U value as compared to Sample A. Sample 3 containing surface features with a generally triangular shape, wherein the portion of the triangle that would have been the point is replaced by a generally substantial circular shape, has a 51% decrease in the U value as compared to Comparative Sample A with no surface features.

Sample 1, which has a surface feature height of 0.275 mm has increased surface area ($45.1 \times 10^{-3}$ m$^2$ vs. $41.0 \times -10^{-3}$ m$^2$) and decreased thermal transmittance (1.694 W/m$^2$K vs. 1.811 W/m$^2$K) as compared to Sample C, which has a surface feature height of 0.4 mm. Sample 2, having a surface feature height of 0.1 mm has further increased surface area as compared to both Samples B and C, which have surface feature heights of 0.2 mm and 0.4 mm respectively, and an even further decreased thermal transmittance value. It was unexpected to discover that the surface feature shapes as disclosed and described herein have lower thermal transmittance values per unit area even when the surface height is less. Sample 3 demonstrates the effect of increasing the surface feature height with the present shapes. In Sample 3, the surface feature height is 0.61 mm and a substantial increase in the surface area and decrease in the U value and linear normalized U value is observed as compared to all the samples. This was a surprising result, as the values for surface area and thermal transmittance for Sample C with a comparable surface feature height of 0.4 are significantly higher (e.g., for the normalized linear U value 29.7 W/km·K (Watts per kilometer Kelvin) as compared to 17.6 W/km·K for Sample 3.

Figure 7:
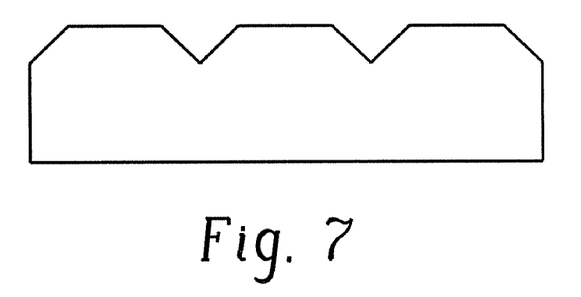
FIG. 7 is a side view of a sheet with truncated triangular surface features.

Comparative Samples B and C demonstrate normalized linear U values of 31 and 30 W/km·K respectively. As noted above, the thermal transmittance value (U) for a given sheet is limited by a saturation point with the number of air cavities present in the sheet. Samples B and C with surface features as illustrated in FIGS. 7 and 8 illustrate the difficulty of achieving a thermal transmittance value close or equal to that of air, even when the surface features are employed. Unexpectedly and previously unknown, by using the surface features with the unusual, shapes as illustrated in Samples 1, 2, and 3, the surface area is increased, attaining a decrease in the normalized thermal transmittance value to near and even less than air (25 W/km·K). Sample 1 has a linear normalized U value of 27.6 W/km·K, Sample 2 has a linear normalized U value equal to that of air at 25 W/km·K, and Sample 3 has a linear normalized U value less than air at 17.6 W/km·K. These values close to, or in the case of Sample 3, less than the U value of air were surprising and unexpected because as noted by the Comparative Samples, it is difficult to achieve thermal transmittance values near that of air and even more difficult to achieve thermal transmittance values less than that of air. The thermal transmittance values for Comparative Samples A, B, and C are all significantly higher than air, while those for Samples 1, 2, and 3 are near, equal to, or less than the value for air. Hence, with the multiwall sheets disclosed herein, U values of less than or equal to 27 W/km·K were attained, specifically, less than or equal to 25 W/km·K, more specifically, less than or equal to 20 W/km·K, and even less than or equal to 18 W/km·K.

Table 3 demonstrates that a greater than or equal to 0.40 W/m²K decrease in the thermal transmittance value (U value) can be achieved with the complex shapes of the present application (e.g., with other than simple shapes, such as standard triangles, pyramids, and the like), specifically greater than or equal to 0.55 W/m²K, and more specifically greater than or equal to 1.00 W/m²K. Table 3 further demonstrates that as the heat transfer area increases, the U value decreases. The heat transfer area can increase by greater than or equal to 35%, more specifically greater than or equal to 50%, even more specifically greater than or equal to 75%, and even greater than or equal to 100% when the multiwall sheet contains the profile surface features as described herein.

As compared to the features formed by the hash lines in FIG. 2, the present features desirably have an increase in surface area (per unit area) of greater than or equal to 10%, more specifically greater than or equal to 25%, still more specifically greater than or equal to 40%, even more specifically greater than or equal to 50%, and yet more specifically still greater than or equal to 60% when the sheet contains the profiled surface features as described herein. When compared to the same unit area of a planar, flat, non-profiled surface (i.e., a surface with no surface features), the present features desirably have an increase in surface area (per unit area) of greater than or equal to 40%, specifically greater than or equal to 60%, more specifically greater than or equal to 100%, even more specifically greater than or equal to 125%, and yet more specifically still greater than or equal to 150% when the sheet contains the profiled surface features as described herein; e.g., the profiled surface area can be greater than or equal to 250% of the planar, flat, non-profiled surface area for the same unit area. In other words, desirably, the multiwall sheet has a surface area of the greater than or equal to $45 \times 10^{-3}$ m², specifically, greater than or equal to $50 \times 10^{-3}$ m², more specifically, greater than or equal to $60 \times 10^{-3}$ m², even more specifically, greater than or equal to $75 \times 10^{-3}$ m², and even greater than or equal to $80 \times 10^{-3}$ m².

Table 4 illustrates the validation analysis performed on the FEM method as per ISO 10211. As can be seen from Table 3, the values for the boundary conditions for the FEM method correspond to the values given by ISO 10211.

TABLE 4

FEM Validation Results
Temperature (° C.)

|   | FEM   | ISO  |
|---|-------|------|
| A | 7.09  | 7.1  |
| C | 7.92  | 7.9  |
| F | 16.52 | 16.4 |
| H | 16.88 | 16.8 |
| D | 6.27  | 6.3  |
| G | 16.45 | 16.3 |
| B | 0.69  | 0.8  |
| E | 0.75  | 0.8  |
| I | 18.47 | 18.3 |

TABLE 5

Calculated U Values for Three-dimensional Shapes

| Property | Sample D | Sample E | Sample 4 |
|---|---|---|---|
| Sheet Thickness (mm) | 16 | 16.4 | 16.3 |
| Outer/Inner Skin Thickness (mm) | 0.70 | 0.90 | 0.85 |
| Middle Skin Thickness (mm) | 0.15 | 0.15 | 0.15 |
| Diagonal Skin Thickness (mm) | 0.20 | 0.20 | 0.20 |
| Rib Thickness (mm) | 0.45 | 0.45 | 0.45 |
| Distance between Ribs (mm) | 16 | 16 | 16 |
| Weight (kg/m²) | 2.945 | 2.945 | 2.946 |
| Heat Transfer Rate (Watts) | 1.365 | 1.505 | 1.582 |
| Surface Area (m²) | $32.0 \times 10^{-3}$ | $42.7 \times 10^{-3}$ | $51.3 \times 10^{-3}$ |
| Heat Flux (W/m²) | 42.72 | 35.23 | 30.88 |
| Temperature Difference (K) | 20 | 20 | 20 |
| U Value (W/m² K) | 2.135 | 1.761 | 1.544 |
| Change in U Value (%) | N/A | 17.5 | 27.7 |
| Increase in Heat Transfer Area (%) | N/A | 33.5 | 60.2 |
| Normalized Linear U Value (W/km · K) | 34 | 29.7 | 17.6 |
| Equivalent Density (kg/m³) | 184 | 180 | 168 |
| Linear Density Normalized U Value (W · m/kg · K) | $1.84 \times 10^{-4}$ | $1.66 \times 10^{-4}$ | $1.05 \times 10^{-4}$ |

Example 2

Figure 9:
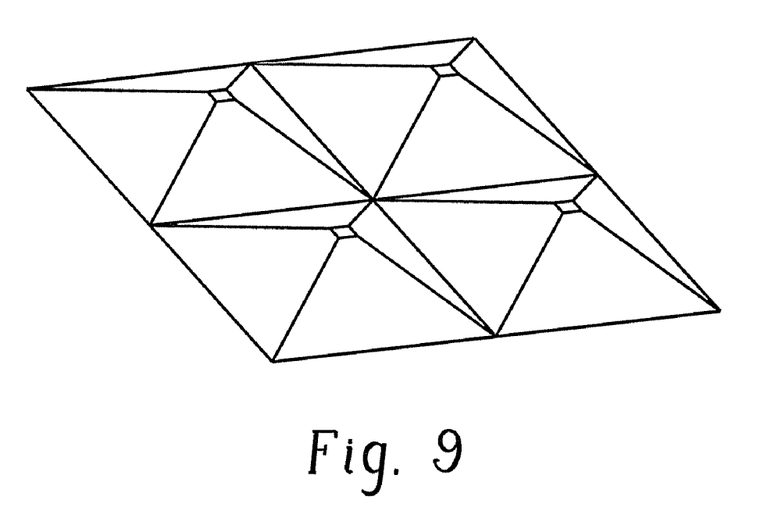
FIG. 9 is a front view of an embodiment of a sheet with three-dimensional profiled surface features.

Table 5 above provides the results obtained with numerical testing of three-dimensional samples. The surface features in Comparative Sample E and Sample 4 comprise three-dimensional shapes. Comparative Sample E contains three-dimensional pyramidal shaped surface features as illustrated in FIG. 9. Sample 4 contains three-dimensional stepped surface features as illustrated in FIG. 5, which correspond to the two dimensional surface features illustrated in FIG. 3. Comparative Sample D contains no surface features, and is similar to two-dimensional Sample A.

Sample 4 provides an increased surface area $51.3 \times 10^{-3}$ m² as compared to Comparative Sample E with a surface area of $42.7 \times 10^{-3}$ m². Sample 4 also provides a lower U value as compared to Comparative Samples D and E at 1.544 W/m²K, an indication that more heat is removed from the multiwall sheet and in Comparative Sample D or E.

The three-dimensional surface features provide a further increase in the heat transfer area and a corresponding decrease in the thermal insulation value for the sheet as compared to the profiled surface features in Table 3. Comparative Sample E has a 17.5% decrease in the thermal insulation value and a 33.5% increase in the heat transfer area compared to Comparative Sample D. Sample 4 provides a nearly 28% decrease in the thermal insulation value and 60% increase in the heat transfer area as compared to Comparative Sample D, indicating that three-dimensional surface features also provide improved properties of the multiwall sheet (e.g., decreased thermal insulation value and increase heat transfer area). Sample 4 even has a 20% increase in the heat transfer area and a 12% decrease in the U value as compared to Comparative Sample E.

Although the multiwall sheet is specifically discussed with regard to naturally lit structures (e.g., greenhouses, sunrooms, and pool enclosures), multiwall sheets comprising profiled surface features can be envisioned as being employed in any application wherein a panel is desired that has a multiwall design and improved insulative properties. Examples of applications include sunroofs, canopies, shelters, windows, lighting fixtures, sun tanning beds, stadium roofing, glazing applications where the multiwall sheet provides thermal control and energy savings, and the like.

A multiwall sheet as made herein with a two dimensional profile shows a thermal transmittance decrease of about 5% to about 100% for a given density and thickness. A three-dimensional profile shows similar thermal resistance improvement. Further improvements are anticipated with various shapes as disclosed herein and increased surface feature heights. As demonstrated by the samples, increased surface feature height with the shapes as disclosed herein provides increased surface area and decreased thermal transmittance.

Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the wall(s) includes one or more walls). The notation "±10%" means that the indicated measurement can be from an amount that is minus 10% to an amount that is plus 10% of the stated value. Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments and are not limited to the specific combination in which they are discussed.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A multiwall sheet comprising:
    a first sheet comprising a planar inner surface and an outer surface, wherein the outer surface has surface features and has a surface area of greater than or equal to 140% of a planar, flat, non-profiled surface area for a same unit area;
    a second sheet comprising a first surface and a second surface; and
    a rib disposed between the inner surface and the first surface;
    wherein the multiwall sheet has a normalized thermal insulation value (U) as measured by ISO 10077 of less than or equal to 0.028 W/m·K.

2. The multiwall sheet of claim 1, wherein the surface feature is a complex shape.

3. The multiwall sheet of claim 1, wherein the surface features has a graduated, stepped pattern.

4. The multiwall sheet of claim 1, wherein the surface feature is a complex shape formed by the combination of a triangle and a circle or partial circle.

5. The multiwall sheet of claim 1, wherein the surface area greater than or equal to 150% of the planar, flat, non-profiled surface area for the same unit area.

6. The multiwall sheet of claim 5, wherein the surface area is greater than or equal to 225% of the planar, flat, non-profiled surface area for the same unit area.

7. The multiwall sheet of claim 6, wherein the surface area greater than or equal to 250% of the planar, flat, non-profiled surface area for the same unit area.

8. The multiwall sheet of claim 1, wherein the normalized linear thermal transmittance value is less than or equal to 0.018 W/m·K.

9. The multiwall sheet of claim 8, wherein the normalized linear thermal transmittance value is less than or equal to 0.010 W/m·K.

10. The multiwall sheet of claim 9, wherein the normalized linear thermal transmittance value is less than or equal to 0.001 W/m·K.

11. The multiwall sheet of claim 1, wherein the second surface comprises surface features.

12. The multiwall sheet of claim 1, wherein the second surface comprises second surface features, and wherein the second surface features have a second surface area of greater than or equal to 140% of the planar, flat, non-profiled surface area for the same unit area.

13. The article of claim 1, wherein the rib extends from the inner surface to the first surface.

14. The article of claim 1, wherein the rib extends between the inner surface and the first surface.

15. A method for forming a multiwall sheet, comprising:
    forming a structure comprising
    a first sheet comprising a planar inner surface and an outer surface, wherein the outer surface has surface features and has a surface area of greater than or equal to 140% of a planar, flat, non-profiled surface area for a same unit area;
    a second sheet comprising a first surface and a second surface; and
    a rib disposed between the inner surface and the first surface;
    wherein the multiwall sheet has a normalized thermal insulation value (U) as measured by ISO 10077 of less than or equal to 0.028 W/m·K.

16. The method of claim 15, wherein the forming comprises extrusion.

17. The method of claim 15, wherein the forming comprises coextrusion.

18. The method of claim 15, wherein the forming comprises injection molding.

19. The method of claim 15, wherein the rib extends between the inner surface and the first surface.

20. The method of claim 15, wherein the rib extends from the inner surface to the first surface.

* * * * *